No. 849,729. PATENTED APR. 9, 1907.
W. DUNBAR.
TIRE FOR VEHICLES.
APPLICATION FILED APR. 22, 1905.
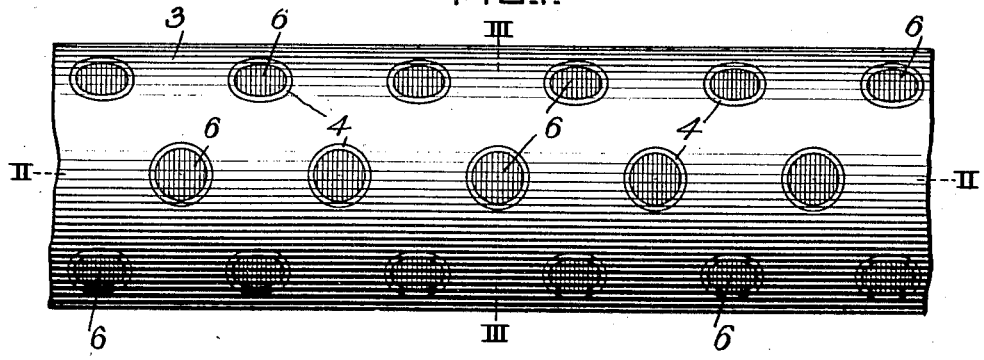
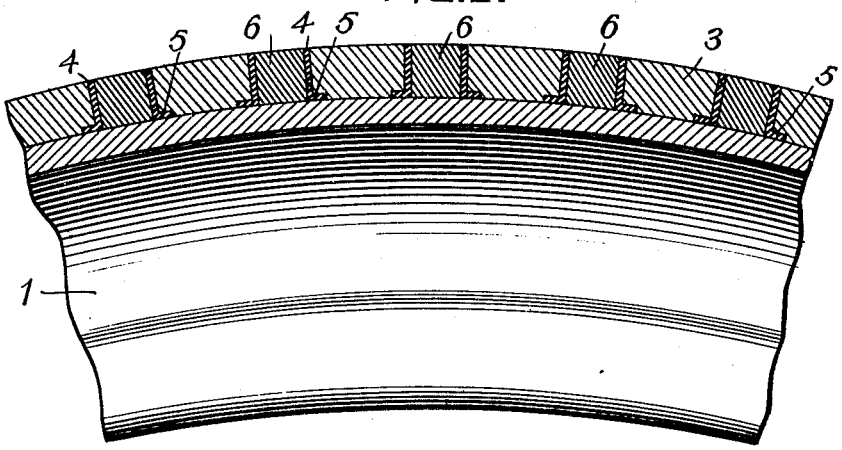
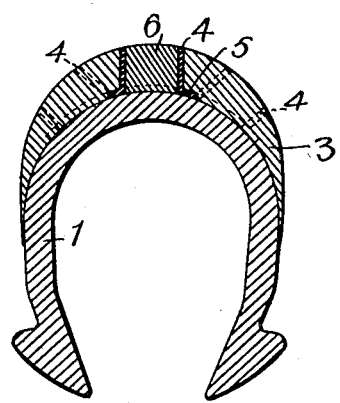
WITNESSES:
Herbert Bradley.
Francis Arnaud
Wilmer Dunbar INVENTOR
by Christy and Christy,
Atty's

UNITED STATES PATENT OFFICE.

WILMER DUNBAR, OF AKRON, OHIO.

TIRE FOR VEHICLES.

No. 849,729.　　　Specification of Letters Patent.　　　Patented April 9, 1907.

Application filed April 22, 1905. Serial No. 256,911.

*To all whom it may concern:*

Be it known that I, WILMER DUNBAR, residing at Akron, in the county of Summit and State of Ohio, a citizen of the United States, have invented or discovered certain new and useful Improvements in Tires for Vehicles, of which improvements the following is a specification.

The invention described herein relates to certain improvements in tires for automobiles, &c., and has for its object the provision of suitable means whereby the slipping of the wheel is prevented.

The invention is hereinafter more fully described and claimed.

In the accompanying drawings, forming a part of this specification, Figure 1 is a plan view of a portion of a tire having my improvement applied thereto. Figs. 2 and 3 are sectional views on planes indicated, respectively, by the lines II II and III III, Fig. 1.

In the practice of my invention the sheath 1, within which is placed the inflating-tube, may be of any suitable construction and applied in any suitable or desired manner to the felly of the wheel. On this sheath is secured by a suitable cement a tread or wearing piece 3. Prior to placing the wearing-piece in position holes or openings are formed therein for the reception of the ferrules 4, provided at their inner ends with heads or enlargements 5, so as to prevent the drawing of the ferrules from position in the wearing-pieces. If desired, these ferrules, which are preferably made of brass, may be secured by vulcanization within the openings in the wearing-piece. These ferrules are filled with plugs 6, which may be of any desired composition—*e. g.*, the material from which the wearing-piece is made or a mixture of rubber, ground cork, and ground fiber. This latter composition will make a harder and more durable substance than the wearing-piece and will in consequence thereof protrude somewhat beyond the surface of the wearing-piece and form points of adherence to the pavements, &c. By compression due to the weight of the vehicle these plugs may be forced inward into the tubes, and thereby form what would be practically suction-pockets, which would tend to hold the tire from slipping. The edges of the ferrules being formed of metal will wear away less rapidly and in use will protrude beyond the surrounding materials and form an additional biting edge.

The ferrules are formed of a material harder than that in the tread portion, and hence will not wear away as rapidly, and it should be characteristic of the material forming the ferrules that the plugs will firmly adhere thereto. As the material of the plugs and the tread portions will adhere very tightly on vulcanization to brass, the ferrules are preferably formed of such material.

I claim herein as my invention—

1. A tire for wheels formed of a yielding material and provided with pockets or recesses and plugs formed of a less yielding but resilient material secured in said pockets or recesses, the outer ends of the plugs forming with the surface of the tire a uniform and regular surface.

2. A tread portion of tires in combination with metal ferrules secured therein and a plug or filling in the ferrules, the wearing-surfaces of the tire, ferrules and plugs being normally in or approximately in the same plane.

3. A tread portion for tires in combination with metal ferrules provided with retaining-heads and secured in the tread portion and a plug or filling in the ferrules.

In testimony whereof I have hereunto set my hand.

WILMER DUNBAR.

Witnesses:
　CHARLES BARNETT,
　FRANCIS VERNAU.